(12) United States Patent
Lin et al.

(10) Patent No.: US 11,397,998 B2
(45) Date of Patent: Jul. 26, 2022

(54) METHOD FOR ASSISTING A USER OF AN ELECTRIC VEHICLE IN RESERVING A RECHARGEABLE BATTERY WITH A CHARGING STATION

(71) Applicant: KWANG YANG MOTOR CO., LTD., Kaohsiung (TW)

(72) Inventors: Chen-Sheng Lin, Kaohsiung (TW); Sen-Hsien Chang, Kaohsiung (TW); Jen-Chiun Lin, Taipei (TW); Po-Yu Chuang, Taipei (TW); Yuh-Rey Chen, Taipei (TW); Te-Chuan Liu, Taipei (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 812 days.

(21) Appl. No.: 16/284,365

(22) Filed: Feb. 25, 2019

(65) Prior Publication Data
US 2019/0272600 A1    Sep. 5, 2019

(30) Foreign Application Priority Data
Mar. 2, 2018   (TW) .................................. 107106998

(51) Int. Cl.
*B60L 50/60* (2019.01)
*B60L 53/66* (2019.01)
(Continued)

(52) U.S. Cl.
CPC .............. *G06Q 50/06* (2013.01); *B60L 50/60* (2019.02); *B60L 53/66* (2019.02); *B60L 53/67* (2019.02);
(Continued)

(58) Field of Classification Search
CPC .... G06Q 50/06; G06Q 10/02; G06Q 30/0639; B60L 53/67; B60L 53/68; B60L 50/60;
(Continued)

(56) References Cited

U.S. PATENT DOCUMENTS

| | | | | |
|---|---|---|---|---|
| 8,880,270 | B1 * | 11/2014 | Ferguson | B60W 30/00 705/6 |
| 8,965,624 | B2 * | 2/2015 | Hosein | G01C 21/36 701/29.6 |

(Continued)

OTHER PUBLICATIONS

"Active Charging Stations for Electric Vehicles Charging" Published by ResearchGate (Year: 2012).*

*Primary Examiner* — Zeina Elchanti
(74) *Attorney, Agent, or Firm* — Lewis Roca Rothgerber Christie LLP (57) ABSTRACT

A method is proposed to assist a user of an electric vehicle in reserving a rechargeable battery with a charging station. A reservation assistant unit that is related to the electric vehicle computes an estimated travelling distance from a current location corresponding to the electric vehicle to a destination, and computes a remaining distance based on residual electric energy of a rechargeable battery currently used by the electric vehicle. When the estimated travelling distance is greater than the remaining distance, the reservation assistant unit provides charging station information that indicates the closest charging station that has a rechargeable battery available.

8 Claims, 8 Drawing Sheets

(51) Int. Cl.
  *G06Q 10/02* (2012.01)
  *B60L 53/68* (2019.01)
  *B60L 53/80* (2019.01)
  *B60L 53/67* (2019.01)
  *B60L 58/12* (2019.01)
  *G06Q 50/06* (2012.01)
  *G01C 21/34* (2006.01)
  *G06Q 30/06* (2012.01)

(52) U.S. Cl.
  CPC .............. *B60L 53/68* (2019.02); *B60L 53/80* (2019.02); *B60L 58/12* (2019.02); *G01C 21/3453* (2013.01); *G06Q 10/02* (2013.01); *G06Q 30/0639* (2013.01); *B60L 2240/622* (2013.01); *B60L 2250/12* (2013.01); *B60L 2250/16* (2013.01); *B60L 2260/52* (2013.01); *B60L 2260/54* (2013.01); *B60Y 2200/91* (2013.01); *B60Y 2300/91* (2013.01); *B60Y 2400/112* (2013.01)

(58) Field of Classification Search
  CPC .......... B60L 53/66; B60L 58/12; B60L 53/80; G01C 21/3453
  USPC ............................................................ 705/5
  See application file for complete search history.

(56) References Cited

U.S. PATENT DOCUMENTS

| | | | |
|---|---|---|---|
| 10,049,505 B1* | 8/2018 | Harvey | G07C 5/0841 |
| 10,263,862 B1* | 4/2019 | Benkreira | H04L 51/02 |
| 10,477,025 B1* | 11/2019 | Edwards | H04M 3/5232 |
| 10,854,021 B2* | 12/2020 | Weber | B60Q 9/00 |
| 2008/0284678 A1* | 11/2008 | Randel | B60K 35/00 345/55 |
| 2009/0265099 A1* | 10/2009 | Gottlieb | G01C 21/3697 701/532 |
| 2011/0196600 A1* | 8/2011 | Henderson | G01C 22/00 701/123 |
| 2012/0083959 A1* | 4/2012 | Dolgov | G01S 17/86 701/23 |
| 2012/0116670 A1* | 5/2012 | Rosekrans | G01C 21/3626 701/426 |
| 2012/0221234 A1* | 8/2012 | Sujan | G06Q 10/04 701/123 |
| 2013/0173106 A1* | 7/2013 | Konishi | B60W 20/11 701/123 |
| 2017/0074671 A1* | 3/2017 | Yoshimura | H04W 4/46 |
| 2017/0138750 A1* | 5/2017 | Weber | G01C 21/3679 |
| 2017/0146354 A1* | 5/2017 | Boss | G01C 21/3438 |
| 2017/0343366 A1* | 11/2017 | You | G01C 21/3476 |
| 2018/0043785 A1* | 2/2018 | Takatsuka | H01M 10/44 |
| 2018/0080995 A1* | 3/2018 | Heinen | B60L 3/12 |
| 2018/0164105 A1* | 6/2018 | Park | G08G 1/096827 |
| 2018/0238698 A1* | 8/2018 | Pedersen | B60L 58/16 |
| 2018/0260887 A1* | 9/2018 | Takatsuka | B60L 53/31 |
| 2018/0281612 A1* | 10/2018 | Perry | H02J 7/0021 |
| 2019/0061779 A1* | 2/2019 | Mohan | B60W 50/082 |
| 2019/0143831 A1* | 5/2019 | Birek | B60L 58/14 701/22 |
| 2019/0197608 A1* | 6/2019 | Iwai | G07F 17/0057 |
| 2019/0204840 A1* | 7/2019 | Park | G06F 16/29 |
| 2019/0207267 A1* | 7/2019 | Vickery | B60L 53/00 |
| 2019/0226859 A1* | 7/2019 | Li | B60L 58/12 |

\* cited by examiner

METHOD FOR ASSISTING A USER OF AN ELECTRIC VEHICLE IN RESERVING A RECHARGEABLE BATTERY WITH A CHARGING STATION

CROSS-REFERENCE TO RELATED APPLICATION

This application claims priority of Taiwanese Invention Patent Application No. 107106998, filed on Mar. 2, 2018.

FIELD

The disclosure relates to a method for assisting a user of an electric vehicle in reserving a rechargeable battery with a charging station.

BACKGROUND

In general, when a rechargeable battery of an electric vehicle is running out of power, a user of the electric vehicle may replace the rechargeable battery with another one which is sufficiently charged at a charging station. However, if the user notices that the rechargeable battery is low in power on the road, finding a charging station may be time and energy consuming. Even worse, when the user eventually arrives at a charging station, the charging station may not have an available rechargeable battery for the user.

SUMMARY

Therefore, an object of the disclosure is to provide a method that can alleviate at least one of the drawbacks of the prior art.

According to the disclosure, a method for assisting a user of an electric vehicle in reserving a rechargeable battery with a charging station is provided. The method is implemented by an electric vehicle system that includes a reservation assistant unit related to the electric vehicle, and includes: (A) by the reservation assistant unit, computing an estimated travelling distance between a destination and a current location corresponding to the electric vehicle, wherein the reservation assistant unit records a plurality of locations of charging stations each having a plurality of rechargeable batteries, each of the rechargeable batteries have a reservation state being one of an available state and a reserved state, and the reservation assistant unit further records, for each of the charging stations, the reservation state of each of the rechargeable batteries; (B) by the reservation assistant unit, computing a remaining distance that the electric vehicle is able to run based on residual electric energy of a rechargeable battery currently used by the electric vehicle; (C) by the reservation assistant unit, determining whether the remaining distance is greater than the estimated travelling distance; and (D) by the reservation assistant unit, providing charging station information when the reservation assistant unit determines in step (C) that the remaining distance is not greater than the estimated travelling distance, wherein the charging station information indicates a location of one of the charging stations that is closest to the current location among all of the charging stations having at least one of the rechargeable batteries of which the reservation state is the available state.

Another object of the disclosure is to provide an electric vehicle system for assisting a user of an electric vehicle in reserving a rechargeable battery with a charging station.

According to the disclosure, the electric vehicle system includes a plurality of charging stations, and a reservation assistant unit. Each of the charging stations has a plurality of rechargeable batteries, and each of the rechargeable batteries has a reservation state being one of an available state and a reserved state. The reservation assistant unit is related to the electric vehicle, is communicatively coupled to the charging stations via a network, records locations of the charging stations, records, for each of the charging stations, the reservation state of each of the rechargeable batteries, and is configured to: (i) compute an estimated travelling distance between a destination and a current location corresponding to the electric vehicle, (ii) compute a remaining distance that the electric vehicle is able to run based on residual electric energy of a rechargeable battery currently used by the electric vehicle, (iii) determine whether the remaining distance is greater than the estimated travelling distance, and (iv) provide charging station information upon determining that the remaining distance is not greater than the estimated travelling distance. The charging station information indicates one of the charging stations that is closest to the current location among all of the charging stations having at least one of the rechargeable batteries of which the reservation state is the available state.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
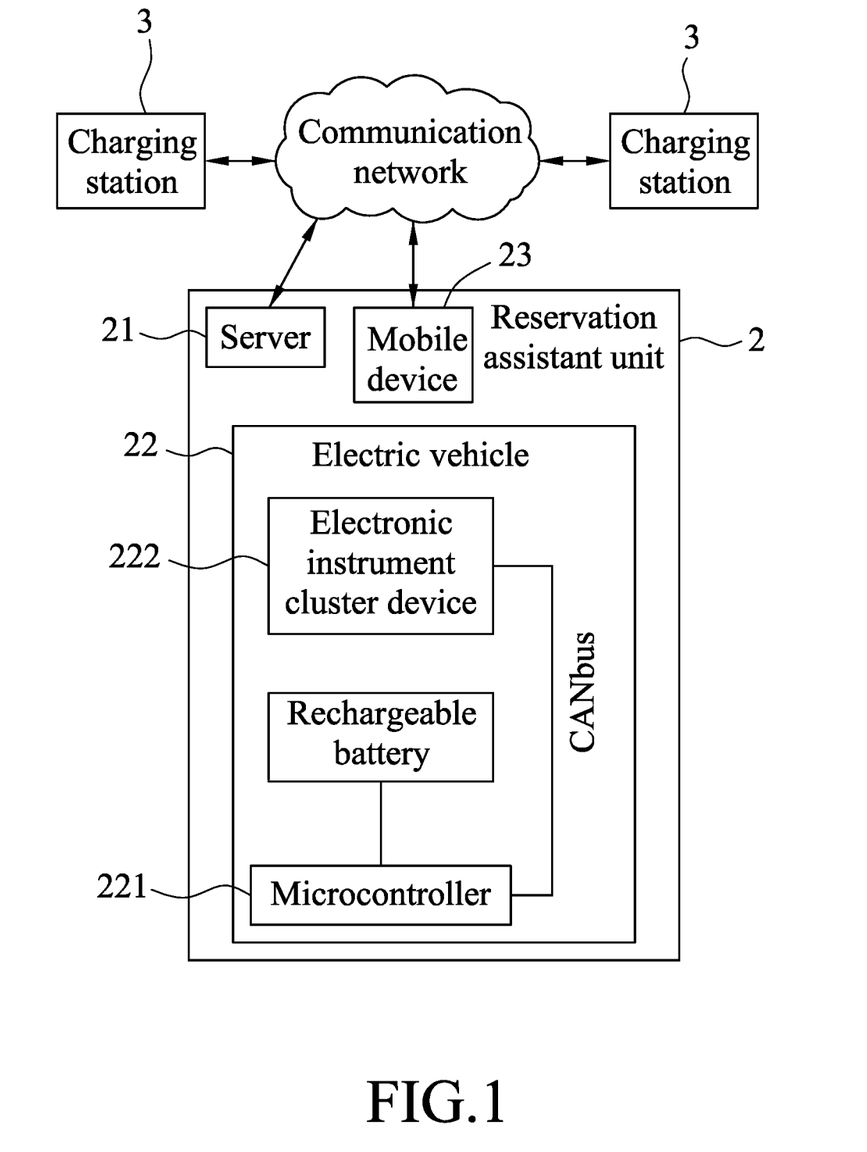
FIG. 1 is a block diagram illustrating an embodiment of the electric vehicle system according to the disclosure.

Referring to FIG. 1, the embodiment of the electric vehicle system for assisting a user of an electric vehicle in reserving a rechargeable battery with a charging station according to this disclosure is shown to include a reservation assistant unit 2 and a plurality of charging stations 3 each having a plurality of rechargeable batteries (not shown). For each of the charging stations 3, each of the rechargeable batteries has a reservation state being one of an available state and a reserved state.

The reservation assistant unit 2 includes a server 21, an electric vehicle 22, and a mobile device 23. The electric vehicle 22 is installed with a rechargeable battery for obtaining electric power therefrom, and includes a microcontroller 221 coupled to the rechargeable battery for monitoring residual electric energy thereof, and an electronic instrument cluster device 222. The mobile device 23 may be, for example, a smartphone, a wearable device, a tablet computer, etc., which has computation capability and navigation functionality, and may include a processing unit (e.g., a single-core or multi-core processor), a storage unit (e.g., flash memory), a wireless communication unit (e.g., a Bluetooth module, a Wi-Fi module, a near field communication module), a display unit (e.g., a liquid crystal display (LCD), an organic light-emitting diode display), an input unit (e.g., a keyboard, a touch screen, a microphone), a positioning unit (e.g., a GPS device), and a network communication unit for connection via a network (e.g., the Internet) to the server 21. The electronic instrument cluster device 222 may include a processor module (e.g., a single-core or multi-core processor), a wireless communication module (e.g., a Bluetooth module, a Wi-Fi module, a near field communication module), and a storage module (e.g., a hard disk drive, flash memory, etc.). The electronic instrument cluster device 222 is capable of pairing with and/or connecting to the mobile device 23 which is, for example, carried by the user or put in/mounted to the electric vehicle 22, via the wireless communication module thereof and the wireless communication unit of the mobile device 23, so that the electronic instrument cluster device 222 can receive data from the mobile device 23. The server 21 is communicatively coupled to the charging stations 3 through the network, and records locations of the charging stations 3, and, for each of the charging stations 3, the reservation state of each of the rechargeable batteries (available or reserved, which may be provided by the charging station 3 through the network in real time).

Figure 2:
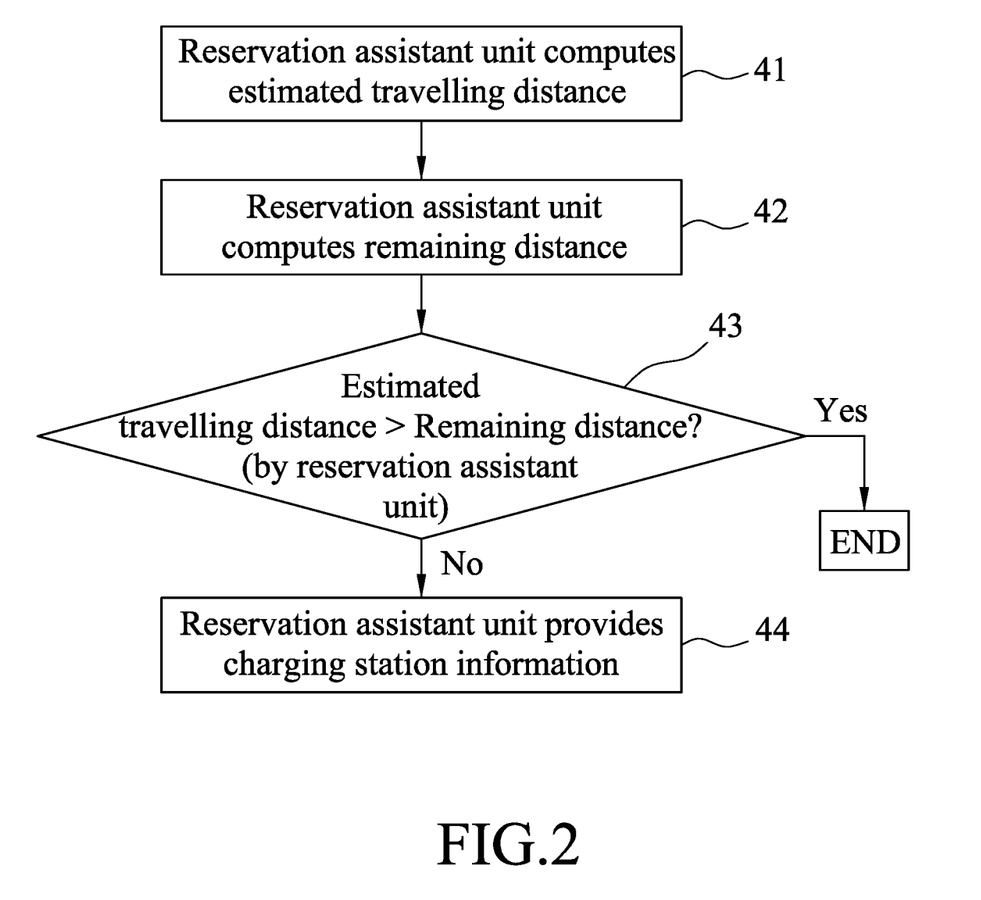
FIG. 2 is a flow chart illustrating steps of an embodiment of the method for assisting a user of an electric vehicle in reserving a rechargeable battery with a charging station according to this disclosure.

Further referring to FIG. 2, the embodiment of electric vehicle system assists the user in reserving a rechargeable battery for the electric vehicle by steps 41-44.

In step 41, the reservation unit 2 computes an estimated travelling distance between a destination and a current location corresponding to the electric vehicle. In this embodiment, the user may operate the mobile device 23 to input the destination into the reservation assistant unit 2, and the current location corresponding to the electric vehicle 22 may refer to, for example, a current location of the mobile device 23, which can be obtained via the positioning unit of the mobile device 23.

Figure 3:
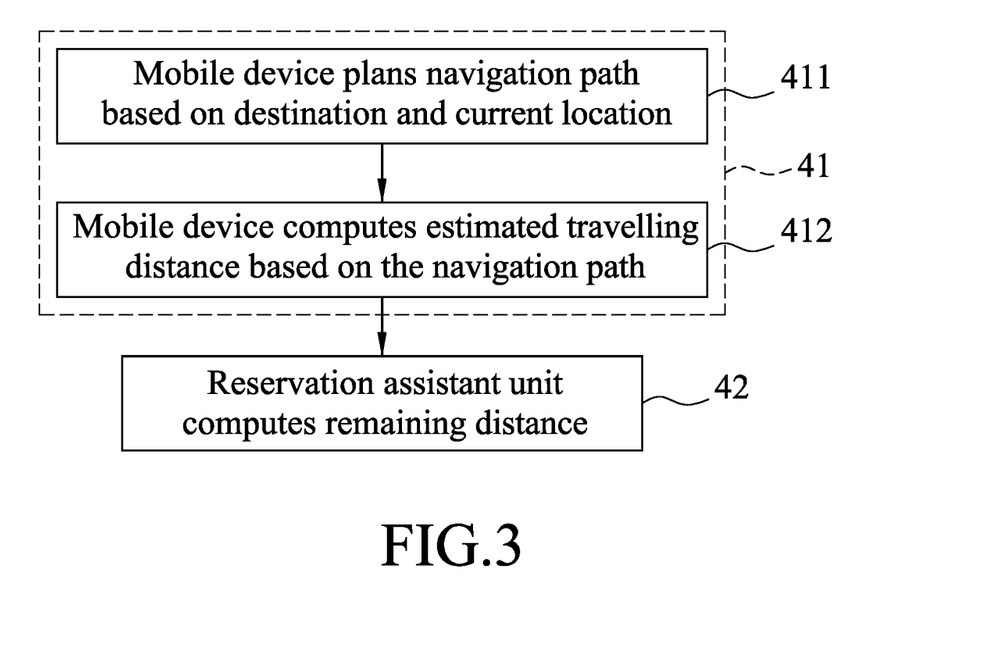
FIG. 3 is a flow chart illustrating one implementation of step 41 in FIG. 2.

In one implementation of step 41 as shown in FIG. 3, the mobile device 23 executes a built-in navigation software program to obtain the current location corresponding to the electric vehicle 22 via the positioning unit, plan a navigation path based on the destination and the current location (step 411), and compute the estimated travelling distance based on the navigation path (step 412).

Figure 4:
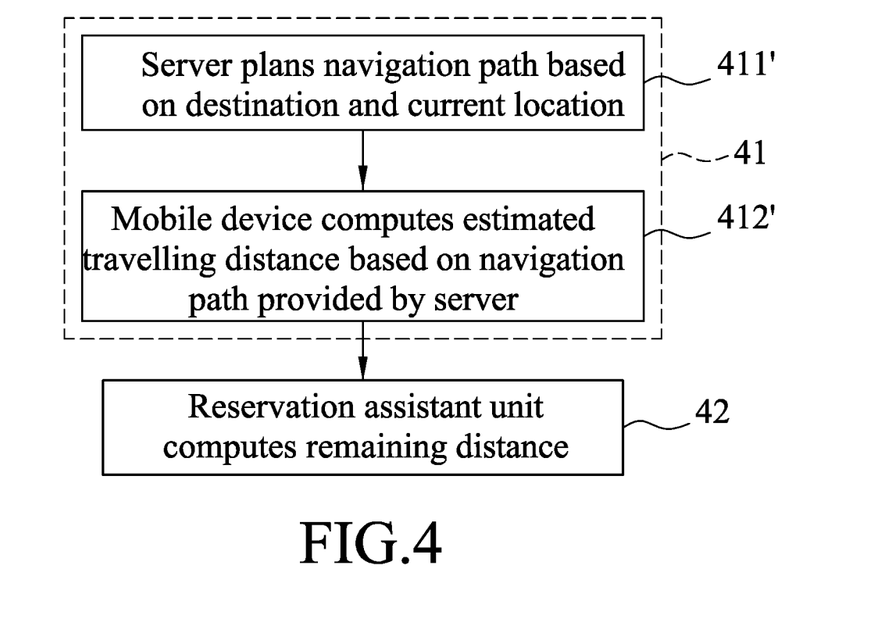
FIG. 4 is a flow chart illustrating another implementation of step 41 in FIG. 2.

In one implementation of step 41 as shown in FIG. 4, the mobile device 23 obtains the current location corresponding to the electric vehicle 22 via the positioning unit, and transmits the current location and the destination to the server 21. The server 21 plans a navigation path based on the destination and the current location, and transmits the navigation path to the mobile device 23 (step 411'). The mobile device 23 then computes the estimated travelling distance based on the navigation path (step 412').

Figure 5:
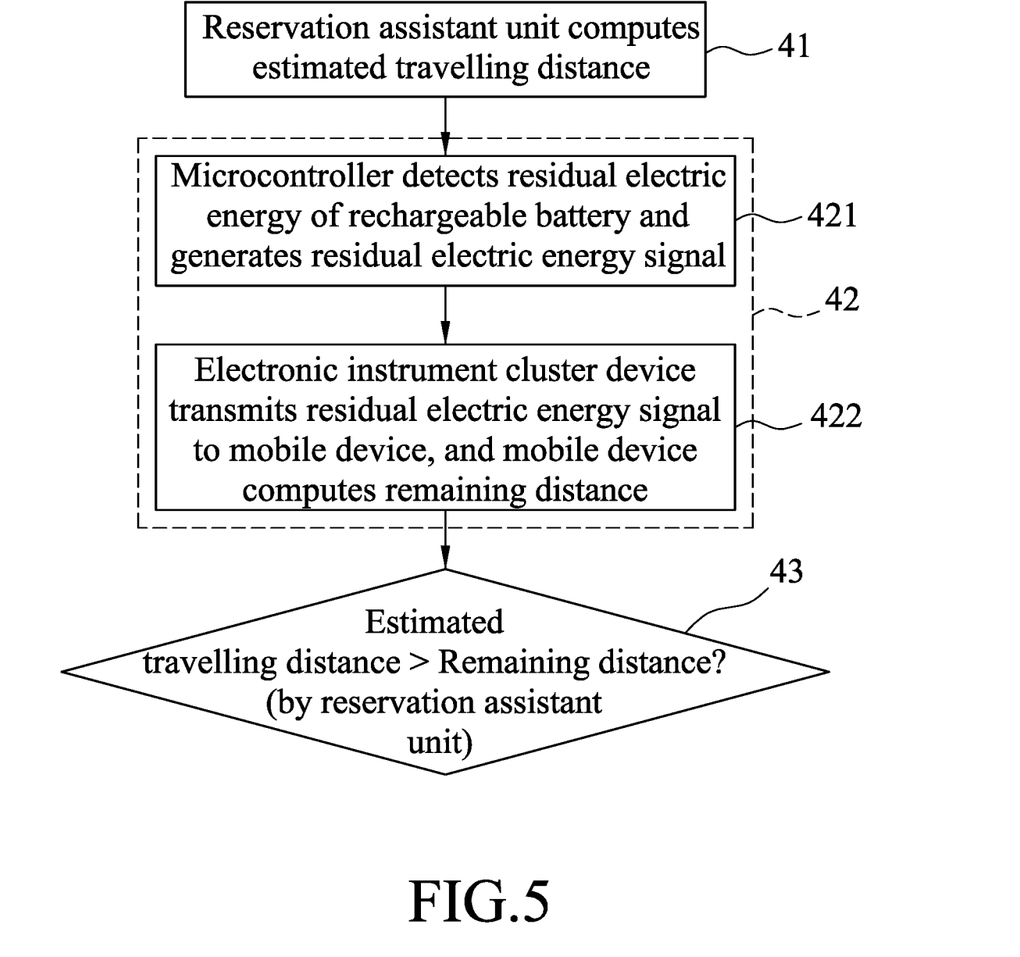
FIG. 5 is a flow chart illustrating one implementation of step 42 in FIG. 2.

In step 42 (see FIG. 2), the reservation assistant unit 2 computes a remaining distance that the electric vehicle 22 is able to run based on residual electric energy in the rechargeable battery currently used by the electric vehicle 22 (referred as "currently used rechargeable battery" hereinafter). In one implementation of step 42 as shown in FIG. 5, in step 421, the microcontroller 221 detects the residual electric energy in the currently used rechargeable battery of the electric vehicle 22, and generates a residual electric energy signal that indicates the residual electric energy; and the electronic instrument cluster device 222 receives the residual electric energy signal from the microcontroller 221 via, for example, a controller area network bus (CANbus), and then transmits the residual electric energy signal to the mobile device 23 via, for example, Bluetooth communication. In step 422, the mobile device 23 computes the remaining distance based on the residual electric energy indicated by the residual electric energy signal (step 422).

Figure 6:
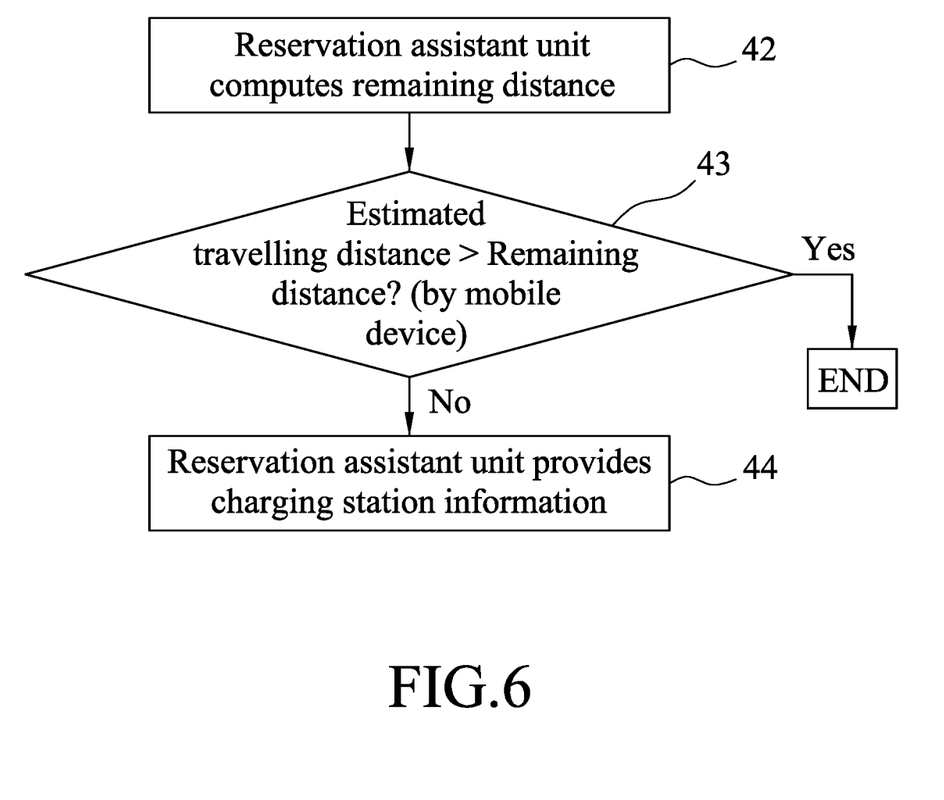
FIG. 6 is a flow chart illustrating one implementation of step 43 in FIG. 2.
Figure 7:
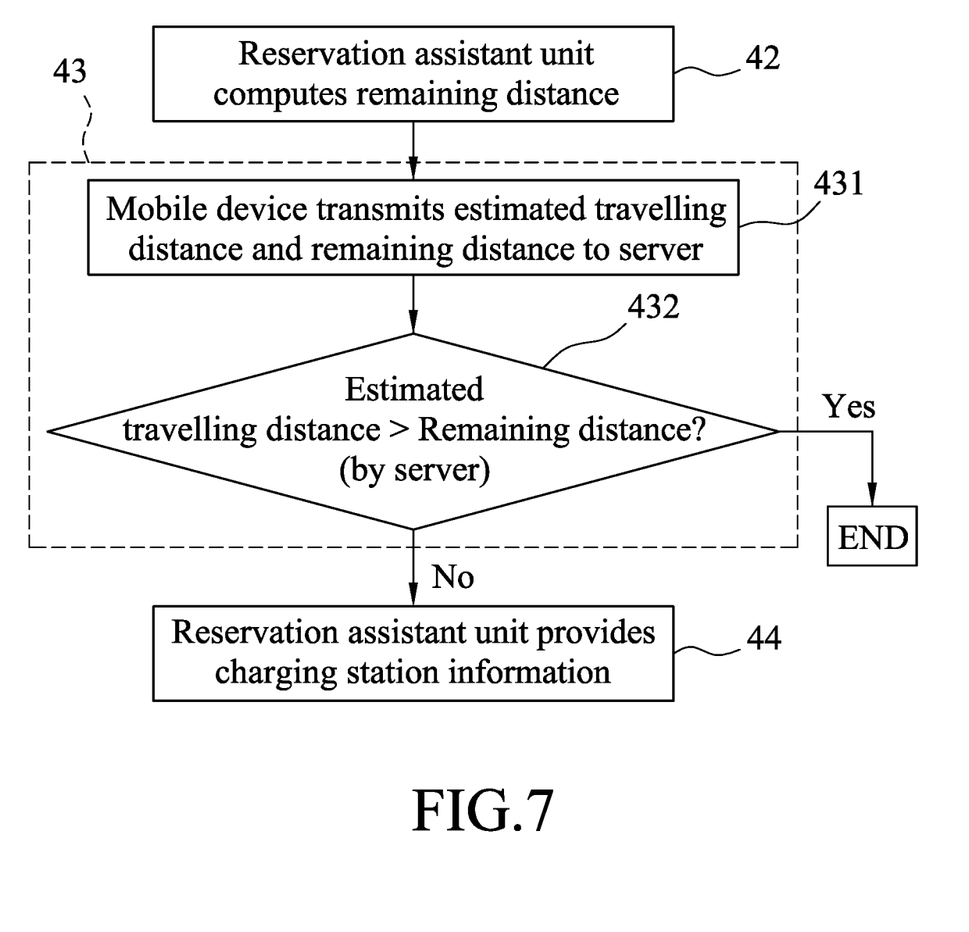
FIG. 7 is a flow chart illustrating another implementation of step 43 in FIG. 2.

In step 43 (see FIG. 2), the reservation assistant unit 2 determines whether the remaining distance is greater than the estimated travelling distance. The flow ends when the determination is affirmative, and goes to step 44 when the determination is negative. In one implementation of step 43 as shown in FIG. 6, the mobile device 23 determines whether the remaining distance is greater than the estimated travelling distance. In one implementation of step 43 as shown in FIG. 7, the mobile device 23 transmits the estimated travelling distance and the remaining distance to the server 21 (step 431), and the server 21 determines whether the remaining distance is greater than the estimated travelling distance (step 432).

In step 44 (see FIG. 2), the reservation assistant unit 2 provides charging station information that indicates a location of one of the charging stations 3 that is closest to the current location among all of the charging stations 3 having at least one of the rechargeable batteries of which the reservation state is the available state (said one of the charging stations 3 is referred as a recommended charging station hereinafter).

Figure 8:
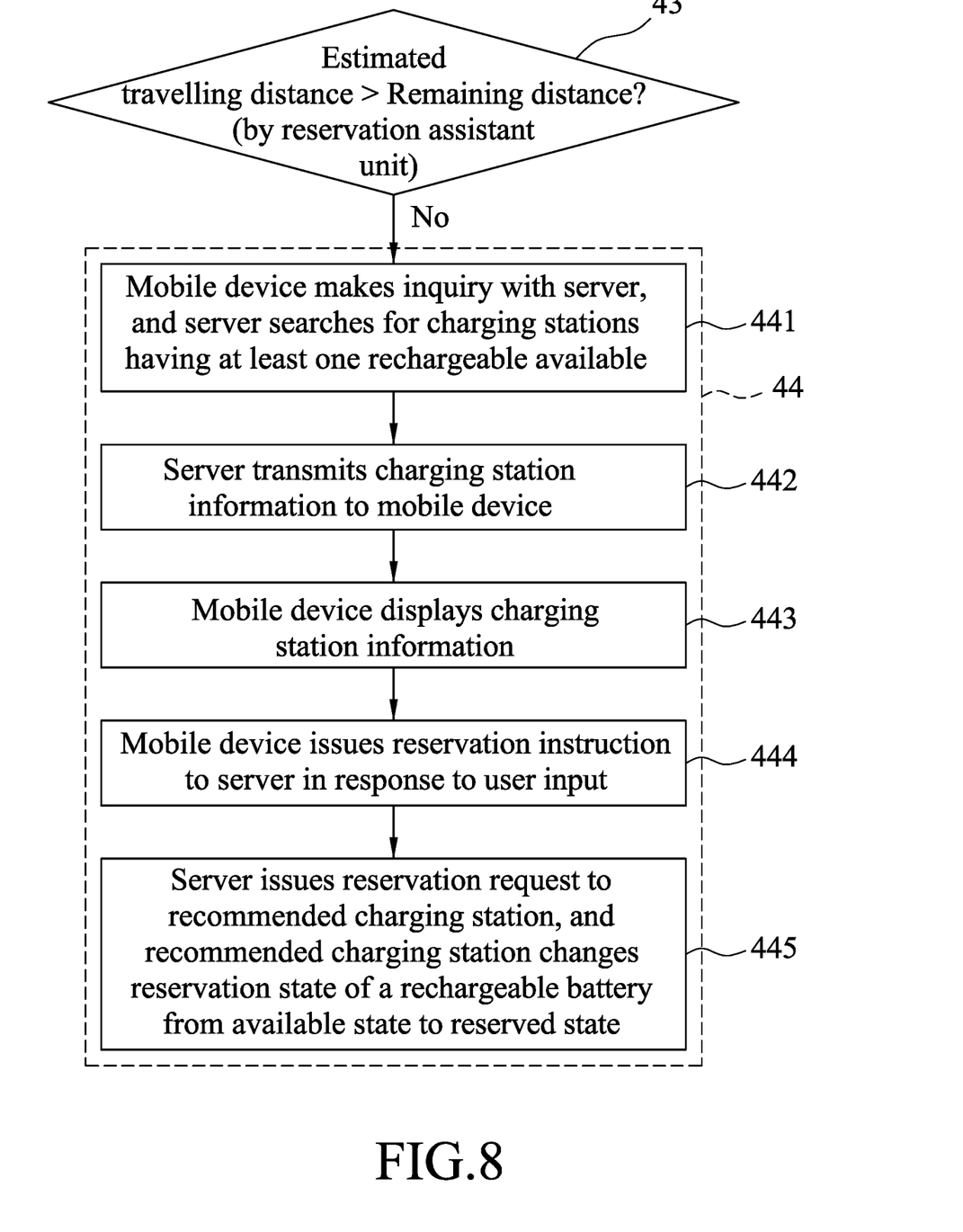
FIG. 8 is a flow chart illustrating one implementation of step 44 in FIG. 2.

In one implementation of step 44 as shown in FIG. 8, where the determination in step 43 is made by the mobile device 23, the mobile device 23 issues an inquiry instruction to the server 21 to make an inquiry with the server 21 for a nearby charging station 3 that has at least one rechargeable battery in the available state, such that the server 21 searches for charging stations 3 having at least one rechargeable battery in the available state (step 441). Then, the server 21 transmits the charging station information to the mobile device 23 in response to receipt of the inquiry instruction (step 442). Upon receipt of the charging station information, the mobile device 23 displays the charging station information for notifying the user of the location of the recommended charging station (step 443). Then, the user may operate the mobile device 23 to transmit a reservation instruction to the server 21 in response to a user input for reserving a rechargeable battery for the electric vehicle (step 444). Upon receipt of the reservation instruction, the server 21 transmits, based on the reservation instruction, a reservation request to the recommended charging station indicated by the charging station information (step 445), such that the recommended charging station changes the reservation state of one of the rechargeable batteries thereof from the available state to the reserved state based on the reservation request.

Figure 9:
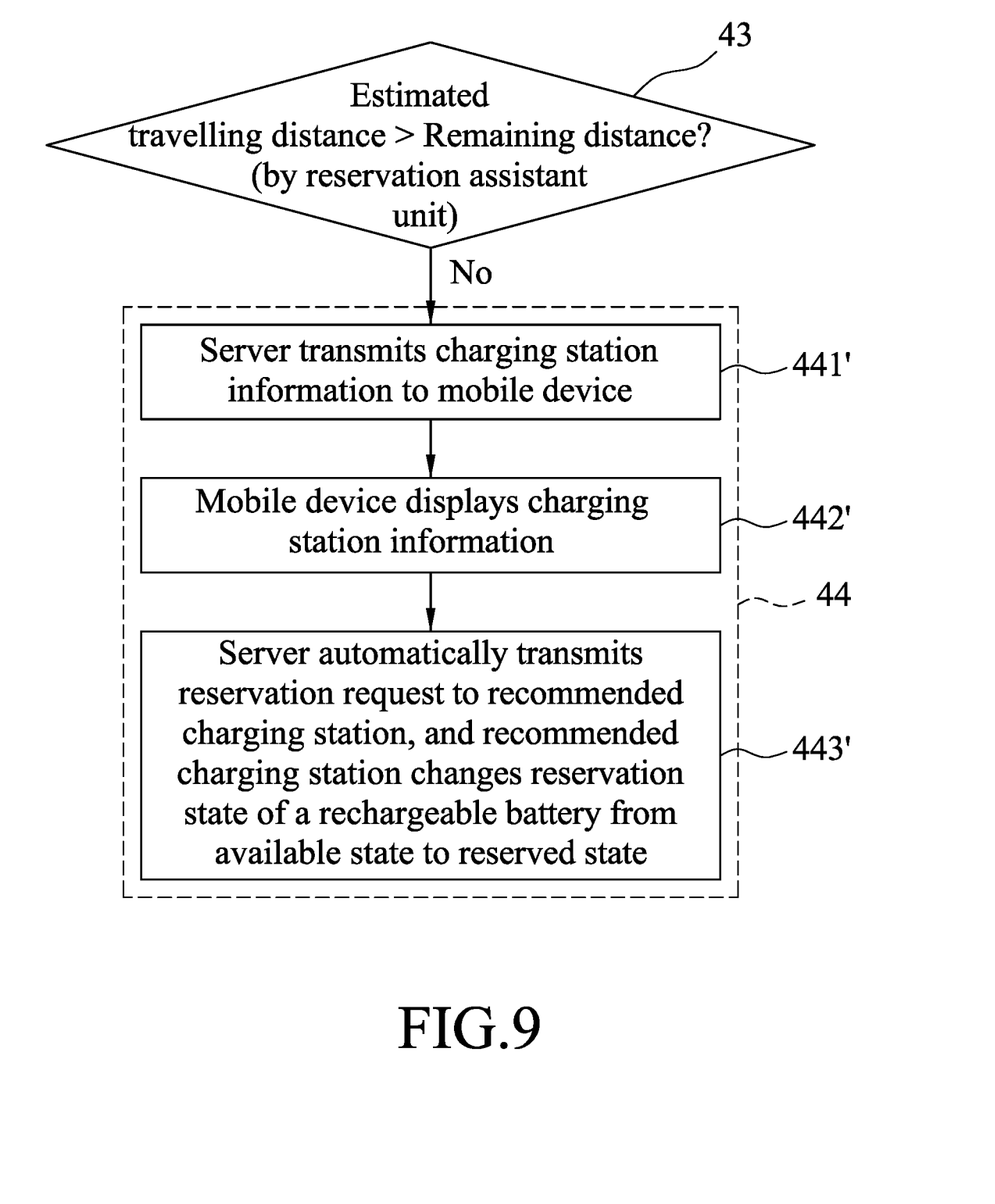
FIG. 9 is a flow chart illustrating another implementation of step 44 in FIG. 2.

In one implementation of step 44 as shown in FIG. 9, where the determination in step 43 is made by the server 21, the server 21 transmits the charging station information to the mobile device 23 (step 441'). Upon receipt of the charging station information, the mobile device 23 displays the charging station information for notifying the user of the location of the recommended charging station (step 442'). Meanwhile, the server 21 automatically transmits a reservation request to the recommended charging station indicated by the charging station information, such that the recommended charging station changes the reservation state of one of the rechargeable batteries thereof from the available state to the reserved state based on the reservation request (step 443').

By virtue of the abovementioned steps 41-44, the reservation assistant unit 2 may determine, before departure of the electric vehicle 22 for the destination, whether the currently used rechargeable battery currently has sufficient electric energy for the electric vehicle 22 to arrive at the destination, assist the user in reserving a sufficiently charged rechargeable battery with the closest charging station (recommended charging station) when the determination is negative, and navigate the user to the recommended charging station.

The embodiment of this disclosure is advantageous in that:

1. The reservation assistant unit 2 determines, based on the residual electric energy of the currently used rechargeable battery, whether the currently used rechargeable battery is required to be replaced for arriving at the destination, preventing the rechargeable battery from running out of power on the road to the destination.

2. Upon determining that the currently used rechargeable battery is required to be replaced for arriving at the destination, the reservation assistant unit 2 looks for the closest charging station that has at least one sufficiently charged rechargeable battery available for the user (recommended charging station), and assists the user in issuing the reservation request to the recommended charging station. Accordingly, such a system allows the user to save time and electric energy in looking for a charging station on the road, and ensures that the user can have a sufficiently charged rechargeable battery for replacement at the charging station.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for assisting a user of an electric vehicle in reserving a rechargeable battery with a charging station, said method being implemented by an electric vehicle system that includes a reservation assistant unit related to the electric vehicle, and comprising:

(A) by the reservation assistant unit, computing an estimated travelling distance between a destination and a current location corresponding to the electric vehicle, wherein the reservation assistant unit records a plurality locations of charging stations each having a plurality of rechargeable batteries, each of the rechargeable batteries having a reservation state being one of an available state and a reserved state, and the reservation assistant unit further records, for each of the charging stations, the reservation state of each of the rechargeable batteries;

(B) by the reservation assistant unit, computing a remaining distance that the electric vehicle is able to run based on residual electric energy of a rechargeable battery currently used by the electric vehicle;

(C) by the reservation assistant unit, determining whether the remaining distance is greater than the estimated travelling distance; and (D) by the reservation assistant unit, providing charging station information when the reservation assistant unit determines in step (C) that the remaining distance is not greater than the estimated travelling distance, wherein the charging station information indicates a location of one of the charging stations that is closest to the current location among all of the charging stations having at least one of the rechargeable batteries of which the reservation state is the available state;

wherein the reservation assistant unit includes a mobile device corresponding to the electric vehicle, and a server communicatively coupled to the mobile device, the server recording the locations of the charging stations, and, for each of the charging stations, the reservation state of each of the rechargeable batteries; and wherein step (C) is performed by the server, and step (D) includes:

(D1) by the server, transmitting the charging station information to the mobile device and automatically transmitting a reservation request to said one of the charging stations that is indicated by the charging station information upon determining in step (C) that the remaining distance is not greater than the estimated travelling distance, such that said one of the charging stations changes the reservation state of one of the rechargeable batteries thereof from the available state to the reserved state based on the reservation request; and (D2) by the mobile device, displaying the charging station information for the user.

2. The method of claim 1, wherein the reservation assistant unit includes a mobile device corresponding to the electric vehicle, and step (A) includes:

(A1) by the mobile device, planning a navigation path based on the destination and the current location; and (A2) by the mobile device, computing the estimated travelling distance based on the navigation path.

3. The method of claim 1, wherein the reservation assistant unit includes a mobile device corresponding to the electric vehicle, and a server communicatively coupled to the mobile device, and step (A) includes:
- (A1) by the server, planning a navigation path based on the destination and the current location, and transmitting the navigation path to the mobile device; and
- (A2) by the mobile device, computing the estimated travelling distance based on the navigation path.

4. The method of claim 1, wherein the reservation assistant unit includes the electric vehicle, and a mobile device corresponding to the electric vehicle and communicatively coupled to the electric vehicle via a Bluetooth connection, and step (B) includes:
- (B1) by the electric vehicle, detecting the residual electric energy of the rechargeable battery currently used thereby, and transmitting a residual electric energy signal that indicates the residual electric energy to the mobile device; and
- (B2) by the mobile device, computing the remaining distance based on the residual electric energy.

5. The method of claim 1, wherein the reservation assistant unit includes a mobile device corresponding to the electric vehicle, and a server communicatively coupled to the mobile device; and
wherein step (A) and step (B) are performed by the mobile device, and step (C) includes:
- (C1) by the mobile device, transmitting the remaining distance and the estimated travelling distance to the server; and
- (C2) by the server, determining whether the remaining distance is greater than the estimated travelling distance.

6. The method of claim 1, wherein the reservation assistant unit includes a mobile device corresponding to the electric vehicle, and a server communicatively coupled to the mobile device, the server recording the locations of the charging stations, and, for each of the charging stations, the reservation state of each of the rechargeable batteries; and
wherein step (C) is performed by the mobile device, and step (D) includes:
- (D1) by the mobile device, making an inquiry with the server for a nearby charging station that has at least one rechargeable battery in the available state upon determining in step (C) that the remaining distance is not greater than the estimated travelling distance;
- (D2) by the server, transmitting the charging station information to the mobile device in response to receipt of the inquiry from the mobile device;
- (D3) by the mobile device, displaying the charging station information for the user;
- (D4) by the mobile device, transmitting a reservation instruction to the server in response to a user input for reserving a rechargeable battery for the electric vehicle; and
- (D5) by the server, transmitting, based on the reservation instruction, a reservation request to said one of the charging stations that is indicated by the charging station information and that serves as a recommended charging station, such that the recommended charging station changes the reservation state of one of the rechargeable batteries thereof from the available state to the reserved state based on the reservation request.

7. An electric vehicle system for assisting a user of an electric vehicle in reserving a rechargeable battery with a charging station, comprising:
a plurality of charging stations each having a plurality of rechargeable batteries, each of the rechargeable batteries having a reservation state being one of an available state and a reserved state; and
a reservation assistant unit related to the electric vehicle, communicatively coupled to said charging stations via a network, recording locations of said charging stations, recording, for each of said charging stations, the reservation state of each of the rechargeable batteries, and configured to:
compute an estimated travelling distance between a destination and a current location corresponding to the electric vehicle,
compute a remaining distance that the electric vehicle is able to run based on residual electric energy of a rechargeable battery currently used by the electric vehicle,
determine whether the remaining distance is greater than the estimated travelling distance, and
provide charging station information upon determining that the remaining distance is not greater than the estimated travelling distance;
wherein the charging station information indicates one of said charging stations that is closest to the current location among all of said charging stations having at least one of the rechargeable batteries of which the reservation state is the available state;
wherein said reservation assistant unit includes a mobile device corresponding to the electric vehicle, and a server communicatively coupled to said mobile device;
wherein said server records the locations of said charging stations, and records, for each of said charging stations, the reservation state of each of the rechargeable batteries;
wherein said server is configured to determine whether the remaining distance is greater than the estimated travelling distance, and to, upon determining that the remaining distance is not greater than the estimated travelling distance, transmit the charging station information to said mobile device and automatically transmit a reservation request to said one of the charging stations that is indicated by the charging station information;
wherein said mobile device is configured to display the charging station information received from said server for the user; and
wherein said one of the charging stations is configured to change the reservation state of one of the rechargeable batteries thereof from the available state to the reserved state based on the reservation request received from said server.

8. The electric vehicle system of claim 7, wherein said reservation assistant unit includes a mobile device corresponding to the electric vehicle, and a server communicatively coupled to said mobile device;
wherein said server records the locations of said charging stations, and records, for each of said charging stations, the reservation state of each of the rechargeable batteries;
wherein said mobile device is configured to determine whether the remaining distance is greater than the estimated travelling distance, and make an inquiry with said server for a nearby charging station that has at least one rechargeable battery in the available state upon determining that the remaining distance is not greater than the estimated travelling distance;
wherein said server is configured to transmit the charging station information to said mobile device in response to receipt of the inquiry from said mobile device;

wherein said mobile device is further configured to display the charging station information received from said server for the user, and to transmit a reservation instruction to said server in response to a user input for reserving a rechargeable battery for the electric vehicle;

wherein said server is further configured to transmit, based on the reservation instruction received from said mobile device, a reservation request to said one of said charging stations that is indicated by the charging station information and that serves as a recommended charging station; and wherein said recommended charging station is configured to change the reservation state of one of the rechargeable batteries thereof from the available state to the reserved state based on the reservation request received from said server.

\* \* \* \* \*